(12) United States Patent
Pan et al.

(10) Patent No.: US 10,921,692 B2
(45) Date of Patent: Feb. 16, 2021

(54) OPTICAL MECHANISM AND PROJECTION DEVICE

(71) Applicant: Coretronic Corporation, Hsin-Chu (TW)

(72) Inventors: Kuan Wei Pan, Hsin-Chu (TW); Li Wei Chang, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/748,828

(22) Filed: Jan. 22, 2020

(65) Prior Publication Data
US 2020/0249551 A1    Aug. 6, 2020

(30) Foreign Application Priority Data

Jan. 31, 2019 (CN) .......................... 201920174732.0

(51) Int. Cl.
| | |
|---|---|
| *G03B 21/14* | (2006.01) |
| *H04N 9/31* | (2006.01) |
| *G02B 7/00* | (2021.01) |
| *G02B 27/00* | (2006.01) |

(52) U.S. Cl.
CPC ......... *G03B 21/14* (2013.01); *G02B 27/0006* (2013.01); *G03B 21/145* (2013.01); *H04N 9/3141* (2013.01)

(58) Field of Classification Search
CPC ........ G03B 21/145; G03B 21/14; G02B 7/00; G02B 7/006; G02B 27/0006; H04N 9/3141
See application file for complete search history.

(56) References Cited

U.S. PATENT DOCUMENTS

2018/0017857 A1\* 1/2018 Nagumo ................ G03B 21/14

FOREIGN PATENT DOCUMENTS

CN          1573516 A      2/2005

\* cited by examiner

*Primary Examiner* — Ryan D Howard

(57) ABSTRACT

An optical mechanism includes a substrate, a supporting pad, an optical element and a fixed member. The substrate has an opening and a recess, the recess surrounds the opening and has a bottom surface. The supporting pad is disposed in the recess and has a convex curved portion, the convex curved portion protrudes away from the bottom surface of the recess, and a gap exists between the convex curved portion and the bottom surface. The optical element is disposed on the substrate, and the optical element covers the opening and abuts against the convex curved portion. The fixed member is fixed on the substrate and is adapted to press the optical element onto the substrate. The optical mechanism and the projection device of the invention can effectively prevent the optical element from being broken.

21 Claims, 6 Drawing Sheets

OPTICAL MECHANISM AND PROJECTION DEVICE

CROSS-REFERENCE TO RELATED APPLICATION

This application claims the priority benefit of China application 201920174732.0, filed on 2019 Jan. 31. The entirety of the above-mentioned patent application is hereby incorporated by reference herein and made a part of this specification.

FIELD OF THE INVENTION

The invention relates to an optical device, and more particularly to an optical mechanism and projection device using the same.

BACKGROUND OF THE INVENTION

The type of light source used in the projection device has evolved from ultra-high pressure mercury lamp (UHP lamp), light emitting diode (LED) to laser diode (LD) with the market demand for brightness, color saturation, service life, non-toxic environmental protection and the like of the projection device.

The projection device can include dust-proof glass between the light valve and the projection lens to prevent external impurities or dust from entering the optical engine and disturbing the light valve, thereby affecting the light output performance. However, in the known dust-proof glass, a stress applied when the flat spring fixes the glass causes a stress at a position where the glass is not pressed by the flat spring. In the case of high brightness models, the glass can withstand higher temperatures. Therefore, due to uneven force and thermal expansion and contraction, the glass is easily broken, which may cause damage to the projector.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides an optical mechanism, which can reduce the damage of the device and further improve the structural stability.

The invention provides a projection device, which can reduce the damage of the device and thus has better structural stability.

Other advantages and objects of the invention may be further illustrated by the technical features broadly embodied and described as follows.

In order to achieve one or a portion of or all of the objects or other objects, an optical mechanism provided in an embodiment of the invention includes a substrate, a supporting pad, an optical element and a fixed member. The substrate has an opening and a recess, the recess surrounds the opening and has a bottom surface. The supporting pad is disposed in the recess and has a convex curved portion, and the convex curved portion protrudes away from the bottom surface of the recess, and a gap exists between the convex curved portion and the bottom surface. The optical element is disposed on the substrate, and the optical element covers the opening and abuts against the convex curved portion. The fixed member is fixed on the substrate and is adapted to press the optical element onto the substrate.

In order to achieve one or a portion of or all of the objects or other objects, an optical mechanism provided in an embodiment of the invention includes a substrate, a supporting pad, an optical element and a flat spring. The substrate has an opening and a recess, the recess surrounds the opening and has a bottom surface. The supporting pad is disposed in the recess and abuts against the bottom surface. The optical element is disposed on the substrate, and the optical element covers the opening and abuts against the supporting pad. The flat spring is fixed on the substrate and is adapted to press the optical element onto the substrate. The flat spring includes a locking portion and a clamping portion, and the locking portion has a locking hole and two positioning holes.

In order to achieve one or a portion of or all of the objects or other objects, a projection device provided in an embodiment of the invention includes an illuminating system, an optical engine system, a projection lens and the optical mechanism as described above. The illuminating system provides an illumination beam. The optical engine system is located on a transmission path of the illumination beam and is adapted to convert the illumination beam into an image beam. The projection lens is located on a transmission path of the image beam and is adapted to project the image beam to a projection target. The optical mechanism is located between the optical engine system and the projection lens.

In the optical mechanism of the embodiment of the invention, the supporting pad has a convex curved portion, when the fixed member presses the optical element onto the substrate and abuts against the supporting pad, the supporting pad has a space for deformation to release a stress on the optical element due to the gap between the convex curved portion and the bottom surface of the recess. Therefore, structural stability can be improved and the optical element can be prevented from being broken due to uneven force. In an optical mechanism according to another embodiment of the invention, the flat spring adapted to press the optical element onto the substrate includes a locking portion and a clamping portion, and the locking portion has a locking hole and two positioning holes. The two positioning holes can further prevent the flat spring from moving after being locked, thereby allowing the flat spring to hold the glass more stably. The projection device of the embodiment of the invention can reduce the damage of the device by using the optical mechanism.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
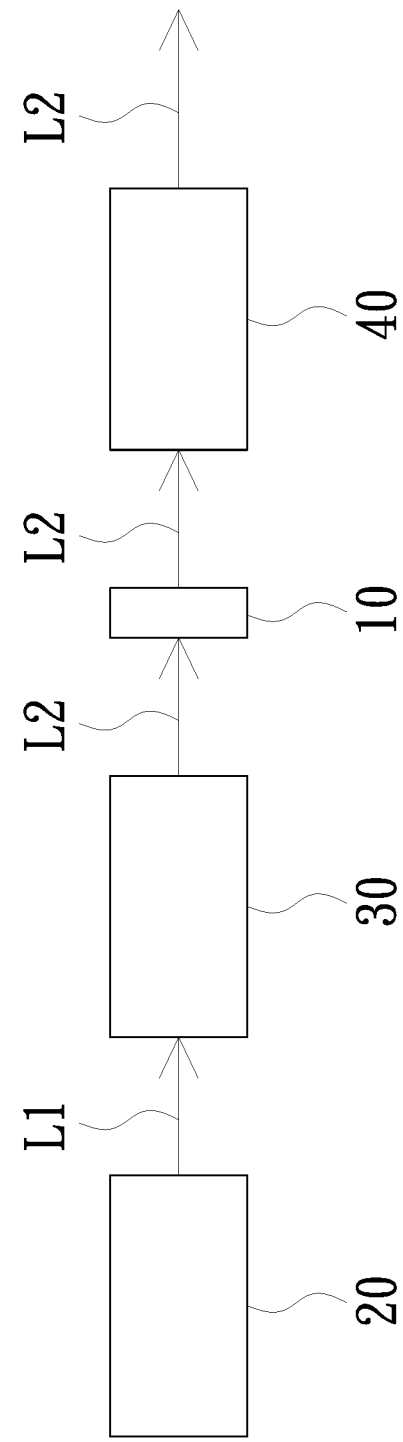
FIG. 1 is a block diagram of a projection device of one embodiment of the invention.

FIG. 1 is a block diagram of a projection device of one embodiment of the invention. Referring to FIG. 1, a projection device 1 of the embodiment includes an optical mechanism 10, an illuminating system 20, an optical engine system 30, and a projection lens 40. The illuminating system 20 provides an illumination beam L1. The optical engine system 30 is located on a transmission path of the illumination beam L1 and is adapted to convert the illumination beam L1 into an image beam L2. The projection lens 40 is located on a transmission path of the image beam L2 and is adapted to project the image beam L2 to the projection target (not shown, for example, a screen or a wall surface), thereby forming an image frame on the projection target. The optical mechanism 10 is located between the optical engine system 30 and the projection lens 40. The image beam L2 emitted from the optical engine system 30 passes through the optical mechanism 10 and is transmitted to the projection lens 40. In the embodiment, the optical mechanism 10 can be used, for example, to prevent dust, which can prevent external impurities or dust from entering optical engine system 30 to affect generation of images, but is not limited thereto.

In some embodiments, the illuminating system 20 includes, for example, an excitation light source and a wavelength conversion wheel (not shown). The excitation light source can be, for example, a diode module including at least one light emitting diode (LED) or at least one laser diode (LD), and the at least one light emitting diodes or the at least one laser diodes can be arranged in a matrix. The excitation light source can provide an excitation beam, but is not limited thereto. A wavelength conversion layer converts the excitation beam into a converted beam, and the illumination beam L1 may include the excitation beam and the converted beam. The illuminating system 20 may further include other optical components to transmit the illumination beam L1 to the optical engine system 30.

In some embodiments, the optical engine system 30 includes, for example, a light valve (not shown) adapted to convert the illumination beam L1 into the image beam L2. The light valve can be a transmissive light valve or a reflective light valve. The transmissive light valve can be a transmissive liquid-crystal display (LCD) panel, and the reflective light valve may be a digital micro-mirror device (DMD) or a liquid crystal on silicon panel (LCOS panel), but is not limited thereto.

In some embodiments, projection lens 40 can include, for example, a combination of one or more optical lenses having a non-zero diopter. For example, various combinations of non-planar lenses such as biconcave lenses, lenticular lenses, meniscus lenses, convex and concave lenses, plano-convex lenses, and plano-concave lenses are included. In an embodiment, projection lens 40 may also include a planar optical lens. The invention does not limit the type of projection lens 40 and its kind. The optical mechanism 10 is disposed between the light valve and the projection lens 40.

Hereinafter, the detailed structure and embodiment of the optical mechanism 10 shown in FIG. 1 will be further described.

Figure 2A:
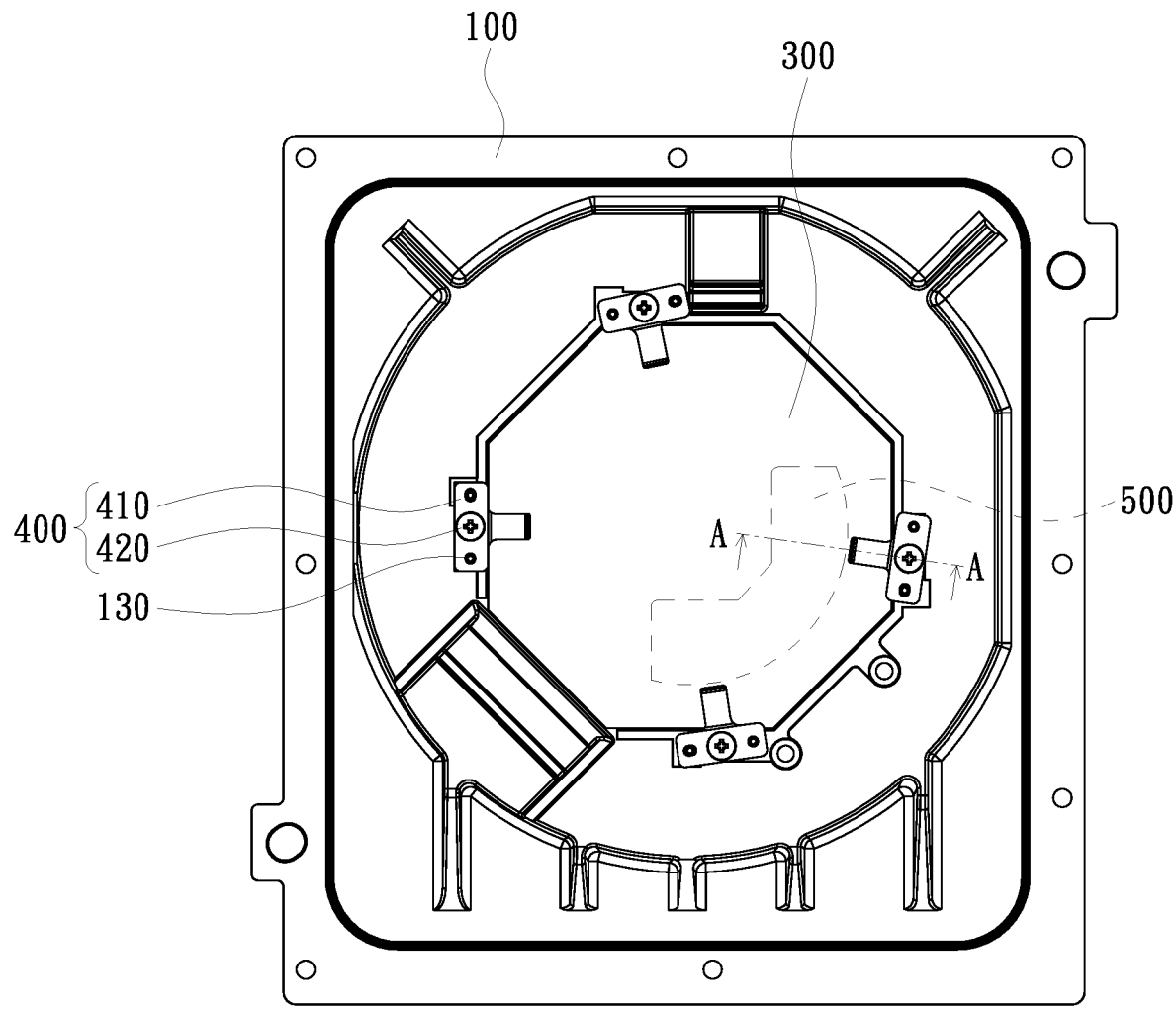
FIG. 2A is a front view of an optical mechanism of one embodiment of the invention.
Figure 2B:
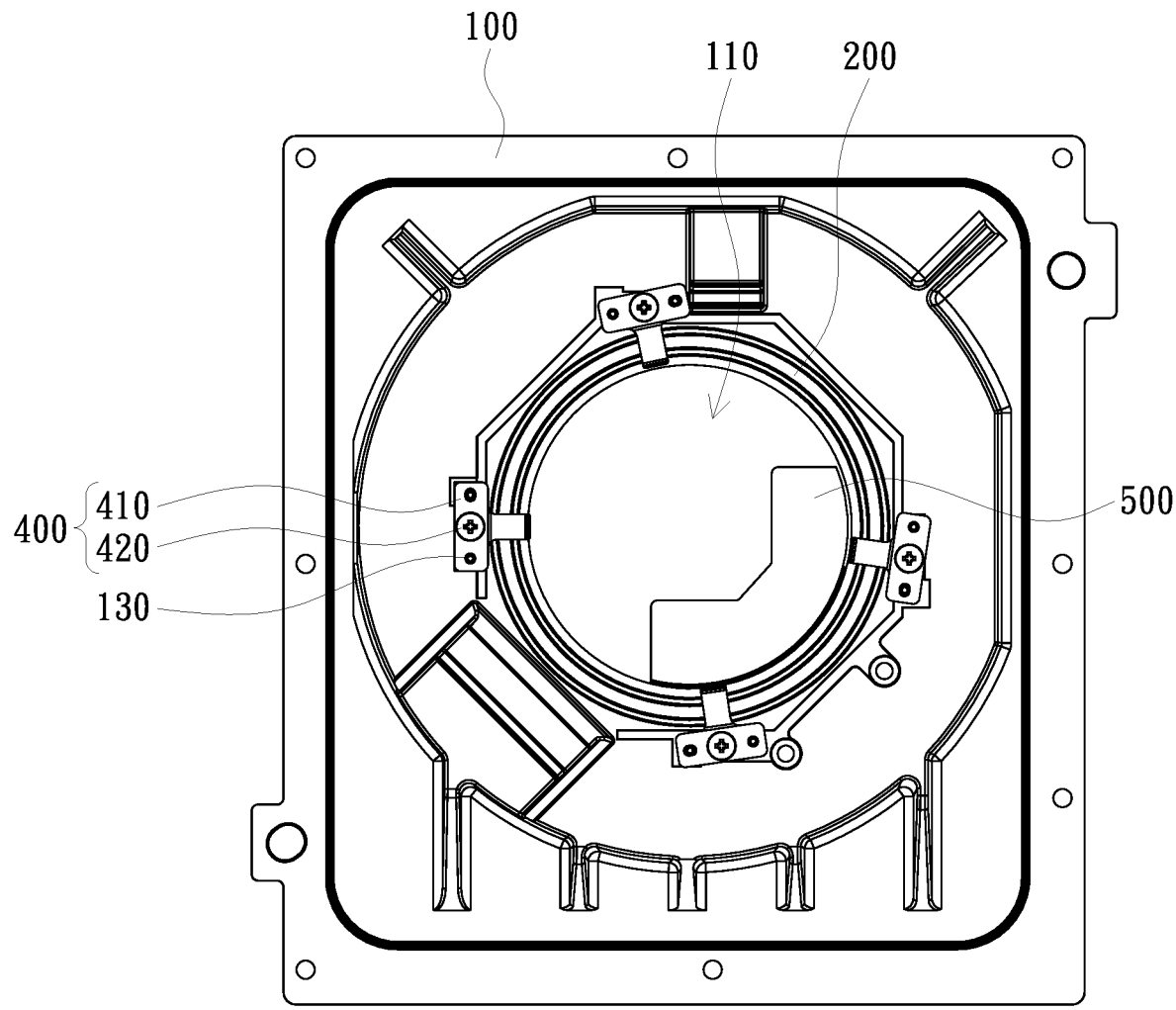
FIG. 2B is a front view of FIG. 2A without the optical element.
Figure 3:
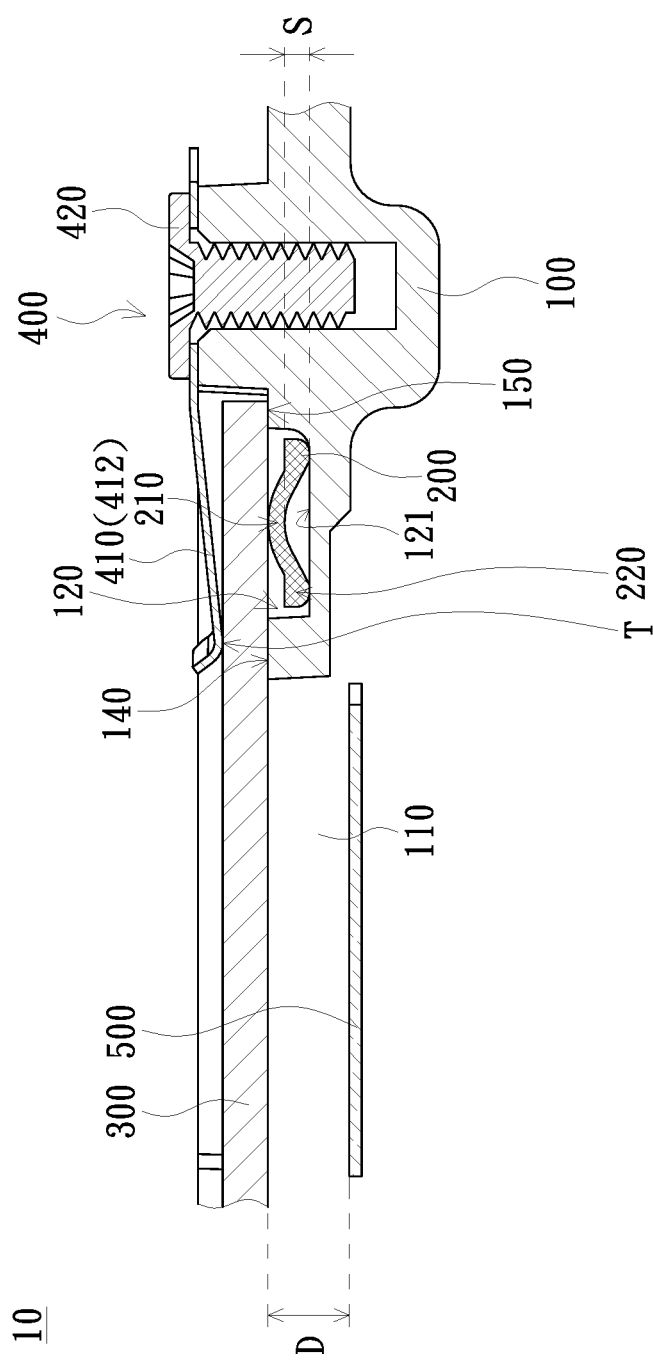
FIG. 3 is a schematic cross-sectional view along a line AA of FIG. 2A.

FIG. 2A is a front view of an optical mechanism of one embodiment of the invention, a viewing direction of FIG. 2A is a direction in which the image beam L2 of FIG. 1 enters the optical mechanism 10. FIG. 2B is a front view of FIG. 2A without the optical element. FIG. 3 is a schematic cross-sectional view along a line AA of FIG. 2A. Referring to FIG. 2A, FIG. 2B and FIG. 3, an optical mechanism 10 of the embodiment includes a substrate 100, a supporting pad 200, an optical element 300 and a fixed member 400. The substrate 100 has an opening 110 and a recess 120. The opening 110 is, for example, circular. The recess 120 is, for example, annular and surrounds the opening 110, and the recess 120 has a bottom surface 121. The supporting pad 200 is disposed in the recess 120 and has a convex curved portion 210. The convex curved portion 210 protrudes, for example, in a direction away from the bottom surface 121 of the recess 120 in the cross-sectional direction of FIG. 3. A gap S exists between the convex curved portion 210 and the bottom surface 121, and a size of the gap S which means a distance between them is preferably greater than or equal to 0.1 mm in FIG. 3. The optical element 300 is disposed on the substrate 100, and the optical element 300 covers the opening 110 and abuts against the convex curved portion 210 of the supporting pad 200. The fixed member 400 is fixed on the substrate 100 and is adapted to press the optical element 300 onto the substrate 100. The image beam L2 of FIG. 1 can be transmitted to the projection lens 40, for example, through the optical element 300 disposed in the opening 110. In addition, referring to FIG. 2A and FIG. 2B, in FIG. 2A, the supporting pad 200 is shielded by the optical element 300, while the optical element 300 is removed in FIG. 2B, the position of the supporting pad 200 can be clearly presented.

In some embodiments, the optical element 300 is, for example, a sheet glass, but is not limited thereto. In other embodiments, the optical element 300 can also be a material such as a transparent acrylic plate or a lens that allows light to pass through.

In some embodiments, the supporting pad 200 further has at least one contact portion 220 on both sides of the convex curved portion 210, and the at least one contact portion 220 can contact the bottom surface 121 of the recess 120. In the embodiment shown in FIG. 3, the quantity of the at least one contact portion 220 is two. When the optical element 300 is not disposed on the substrate 100, the convex curved portion 210 may, for example, protrude from the recess 120. In the embodiment, when the optical element 300 is pressed onto the substrate 100 by the fixed member 400, the supporting pad 200 is subjected to a stress and in a compressed state. The supporting pad 200 is, for example, annular, but is not limited thereto. The supporting pad 200 may be, for example, in the form of a plurality of strips, and may be disposed in the recess 120, respectively. The material of the supporting pad 200 is, for example, rubber or other elastic body that is deformed when subjected to the stress.

In some embodiments, the optical mechanism 10 also includes, for example, a mask 500. The mask 500 may be fixed to the substrate 100 and disposed on a side of the substrate 100 away from the optical element 300 (covered by the optical element 300 in FIG. 2A, indicated by dashed lines). An orthographic projection of the mask 500 on the substrate 100 covers a portion of the opening 110 to mask an unwanted stray light from passing through. The shape and the disposed position of the mask 500 are not particularly limited and can be adjusted according to design requirements. In the embodiment, the mask 500 is adapted to mask the stray light, and the mask 500 rises in temperature due to absorption of energy (heat). Therefore, in the embodiment, a distance D between the mask 500 and the optical element 300 can be, for example, between 0.1 mm and 0.4 mm, thereby reducing the heat transferred from the high temperature mask 500 to the optical element 300, thereby reducing the degree of thermal expansion and contraction of the optical element, and it is possible to effectively prevent the optical element 300 from being broken due to the local heat unevenness.

Figure 4:
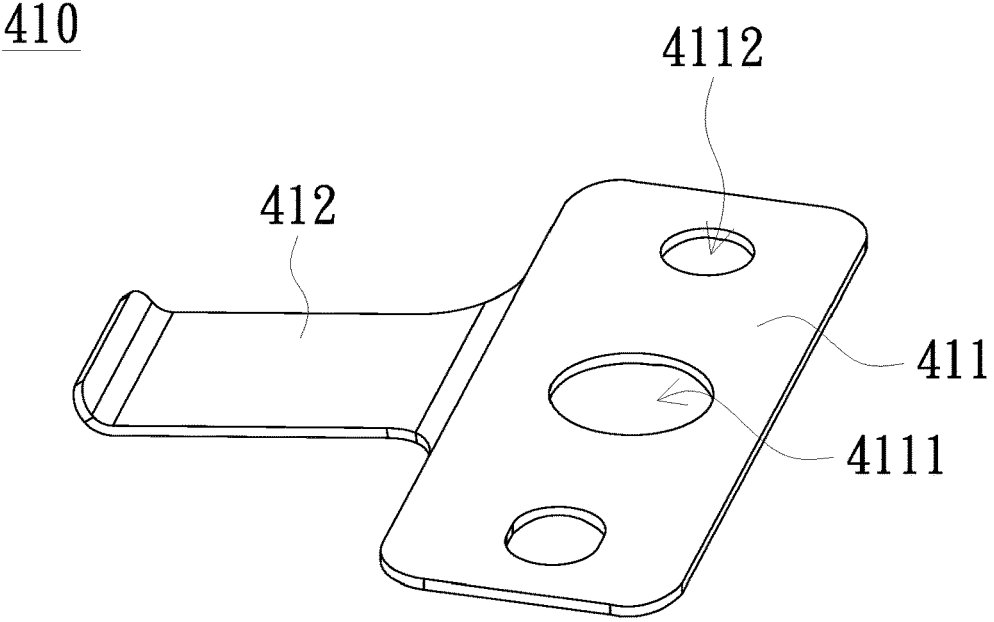
FIG. 4 is a schematic perspective view of a flat spring of one embodiment of the invention.

FIG. 4 is a schematic perspective view of a flat spring of one embodiment of the invention. Referring to FIG. 2A, FIG. 3 and FIG. 4, the fixed member 400 of the embodiment includes, for example, the flat spring 410 and the locking screw 420, but is not limited thereto. The flat spring 410 includes a locking portion 411 and at least one clamping portion 412. The at least one clamping portion 412 presses the optical element 300 onto the substrate 100 to fix the optical element 300. The locking portion 411 has a locking hole 4111 and at least one positioning hole 4112. One end of the locking screw 420 passes through the locking hole 4111 to fix the flat spring 410 to the substrate 100. The substrate 100 further has at least one positioning column 130 corresponding to the at least one positioning hole 4112. When the flat spring 410 is fixed on the substrate 100, the at least one positioning column 130 passes through the at least one positioning hole 4112. The design function of the positioning column 130 and the positioning hole 4112 is to prevent the flat spring 410 from rotating after being fixed on the substrate 100, thereby allowing the flat spring 410 to fix the optical element 300 more stably. In the flat spring 410 of the embodiment, the at least one positioning hole 4112 is two positioning holes, and the at least one clamping portion 412 is one clamping portion, and two positioning holes 4112 are respectively located at both sides of the locking hole 4111, but are not limited thereto. The quantity of the positioning hole 4112 and the clamping portion 412 can be adjusted according to design requirements.

In some embodiments, the substrate 100 further has a first surface 140 and a second surface 150. The recess 120 is located between the first surface 140 and the second surface 150, and the first surface 140 is closer to a central axis of the substrate 100 than the second surface 150 (not shown). In some embodiments, the first surface 140 is between the opening 110 and the recess 120 and the second surface 150 is between the recess 120 and an edge of the substrate 100. The central axis of the substrate 100 described herein refers to an axis that passes through a center of the opening 110 and is perpendicular to a plane in which the substrate 100 is located. In the embodiment, a position near the edge of the substrate 100 can be defined as "outer", and the position near the central axis of the substrate 100 can be defined as "inner". In some embodiments, the central axis of the substrate 100 can coincide with a main optical axis of the image beam L2.

In some embodiments, a contact position T of the at least one clamping portion 412 of the flat spring 410 with the optical element 300 is not particularly limited. In the embodiment shown in FIG. 3, the contact location T may correspond to the first surface 140, that is, the orthographic projection of the contact location T on the substrate 100 is on the first surface 140. In the embodiment, when the flat spring 410 presses the optical element 300 to the substrate 100, the first surface 140 can serve as a support, and the tilting of the optical element 300 can be reduced as compared with the embodiment in which the contact position T corresponds to the recess 120.

In the optical mechanism 10 of the embodiment, the supporting pad 200 has a convex curved portion 210, when the fixed member 400 presses the optical element 300 onto the substrate 100 and abuts against the supporting pad 200, the supporting pad 200 has a space for deformation to release a stress on the optical element 300 due to the gap S between the convex curved portion 210 and the bottom surface 121 of the recess 120. Therefore, structural stability can be improved and the optical element 300 can be prevented from being broken due to uneven force. In addition, the distance between the mask 500 and the optical element 300 can be between 0.1 mm and 0.4 mm, thereby reducing the heat transferred from the high temperature mask 500 to the optical element 300, thereby reducing the degree of thermal expansion and contraction of the optical element, and it is possible to effectively prevent the optical element 300 from being broken due to the local heat unevenness. On the other hand, by the positioning column 130 and the positioning hole 4112, it is possible to prevent the flat spring 410 from rotating after being fixed on the substrate 100, thereby allowing the flat spring 410 to fix the optical element 300 more stably. In some embodiments, by making the contact position T of the at least one clamping portion 412 of the flat spring 410 with the optical element 300 correspond to the first surface 140, when the optical element 300 is pressed onto the substrate 100, the first surface 140 serves as a support, thereby preventing the optical element 300 from tilting. Since the projection device 1 of the embodiment uses the optical mechanism 10 with improved structural stability, it is possible to reduce the damage of the device.

Although the optical mechanism 10 of the embodiment is used for dust prevention in the projection device 1, the above-described design to improve structural stability is generally applicable to any mechanism having a substrate, an optical element, and a fixing member, the invention is not particularly limited.

Figure 5:
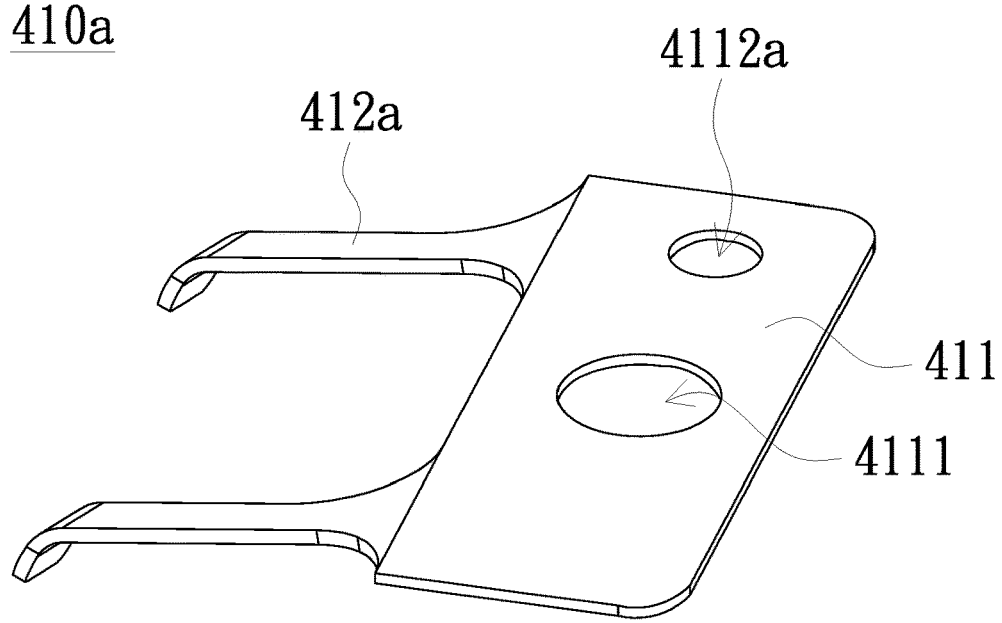
FIG. 5 is a schematic perspective view of a flat spring of another embodiment of the invention.

FIG. 5 is a schematic perspective view of a flat spring of another embodiment of the invention. Referring to FIG. 5, the flat spring 410a of the embodiment is similar in structure and advantages to the flat spring 410 described above, the difference is only in the quantity of the positioning hole and the clamping portion. The quantity of the at least one positioning hole 4112a of the flat spring of the embodiment is one, the quantity of the at least one clamping portion 412a is two.

Figure 6:
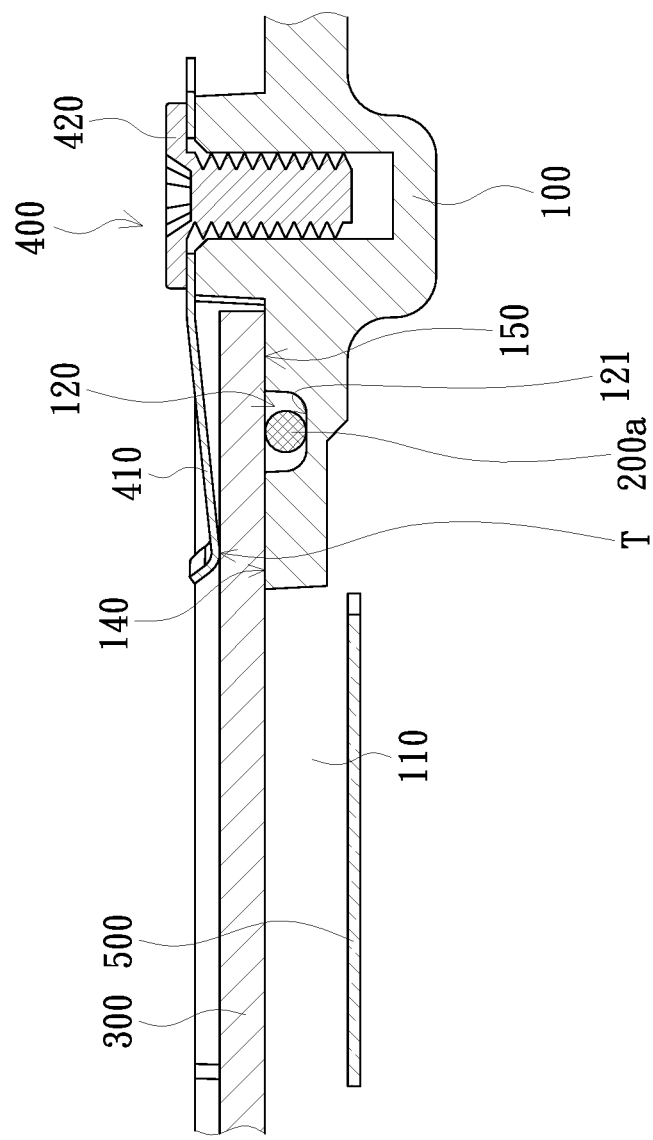
FIG. 6 is a schematic cross-sectional view of an optical mechanism of another embodiment of the invention.

In some embodiments, there is a gap S between the convex curved portion 210 of the supporting pad 200 and the bottom surface 121 of the recess 120, and the gap S provides a space for the supporting pad 200 to deform, thereby the optical element 300 can be prevented from being broken due to uneven force. In other embodiments, the contact position T of the clamping portion 412 of the flat spring 410 with the optical element 300 corresponds to the first surface 140, and the first surface 140 serves as a support, thereby preventing the optical element 300 from tilting. In the above embodiments, the optical mechanism 10, 10a can have better structural stability. Therefore, in other embodiments of the invention, when the contact position T of the clamping portion 412 of the flat spring 410 with the optical element 300 corresponds to the first surface 140, a known supporting pad can also be used. For example, FIG. 6 is a schematic cross-sectional view of an optical mechanism of another embodiment of the invention. Referring to FIG. 6, the optical mechanism 10a of the embodiment is similar in structure and advantages to the optical mechanism 10 described above, the difference is only that there is no gap between the supporting pad 200a disposed in the recess 120 and the bottom surface 121 of the recess 120. The supporting pad 200a is, for example, an O-ring, but is not limited thereto.

In summary, in the optical mechanism of the embodiment, the supporting pad has a convex curved portion, when the fixed member presses the optical element onto the substrate and abuts against the supporting pad, the supporting pad has a space for deformation to release a stress on the optical element due to the gap between the convex curved portion and the bottom surface of the recess. Therefore, structural stability can be improved and the optical element can be prevented from being broken due to uneven force. In addition, the distance between the mask and the optical element can be between 0.1 mm and 0.4 mm, which can also reduce the thermal expansion and contraction of the optical component under the influence of the high temperature mask, which may cause the optical component to be broken due to uneven force. On the other hand, the design of the positioning column and the positioning hole may prevent the flat spring from rotating after being fixed on the substrate, thereby allowing the flat spring to fix the optical element more stably. When the contact position of the at least one clamping portion of the flat spring with the optical element corresponds to the first surface, the tilting of the optical element can be reduced by causing the flat spring to press the optical element to the substrate with the first surface as a support. Since the projection device of the embodiment uses the optical mechanism with improved structural stability, it is possible to reduce the damage of the device.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be adapted to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first surface and the second surface are only used for distinguishing various elements and do not limit the number of the elements.

What is claimed is:
1. An optical mechanism, comprising:
   a substrate, having an opening and a recess, wherein the recess surrounds the opening and has a bottom surface;
   a supporting pad, disposed in the recess and having a convex curved portion, wherein the convex curved portion protrudes away from the bottom surface of the recess, and a gap exists between the convex curved portion and the bottom surface;
   an optical element, disposed on the substrate, wherein the optical element covers the opening and abuts against the convex curved portion; and a fixed member, fixed on the substrate and adapted to press the optical element onto the substrate.

2. The optical mechanism according to claim 1, wherein the opening is circular, the recess is annular.

3. The optical mechanism according to claim 1, wherein a size of the gap is greater than or equal to 0.1 mm.

4. The optical mechanism according to claim 1, wherein the supporting pad further has at least one contact portion on both sides of the convex curved portion, and the at least one contact portion contacts the bottom surface of the recess.

5. The optical mechanism according to claim 1, wherein the fixed member comprises a flat spring, the flat spring comprises:
 a locking portion, having a locking hole and at least one positioning hole; and
 at least one clamping portion, wherein the at least one clamping portion presses the optical element onto the substrate.

6. The optical mechanism according to claim 5, wherein the substrate further has at least one positioning column corresponding to the at least one positioning hole, when the fixed member is fixed on the substrate, the at least one positioning column passes through the at least one positioning hole.

7. The optical mechanism according to claim 5, wherein the fixed member further comprises a locking screw, one end of the locking screw passes through the locking hole to fix the flat spring to the substrate.

8. The optical mechanism according to claim 5, wherein the number of the at least one positioning hole is one, and the number of the at least one clamping portion is two.

9. The optical mechanism according to claim 5, wherein the number of the at least one positioning hole is two, the number of the at least one clamping portion is one, and the two positioning holes are respectively located at both sides of the locking hole.

10. The optical mechanism according to claim 5, wherein the substrate further has a first surface and a second surface, the recess is located between the first surface and the second surface, and the first surface is closer to a central axis of the substrate than the second surface.

11. The optical mechanism according to claim 10, wherein a contact position of the at least one clamping portion of the flat spring with the optical element corresponds to the first surface.

12. The optical mechanism according to claim 1, further comprising:
 a mask, disposed on a side of the substrate away from the optical element, wherein an orthographic projection of the mask on the substrate covers a portion of the opening.

13. The optical mechanism according to claim 12, wherein a distance between the mask and the optical element is between 0.1 mm and 0.4 mm.

14. A projection device, comprising:
 an illuminating system, providing an illumination beam;
 an optical engine system, located on a transmission path of the illumination beam and adapted to convert the illumination beam into an image beam;
 a projection lens, located on a transmission path of the image beam and adapted to project the image beam to a projection target; and
 an optical mechanism, located between the optical engine system and the projection lens, and comprising a substrate, a supporting pad, an optical element and a fixed member, wherein:
  the substrate has an opening and a recess, the recess surrounds the opening and has a bottom surface;
  the supporting pad is disposed in the recess and has a convex curved portion, wherein the convex curved portion protrudes away from the bottom surface of the recess, and a gap exists between the convex curved portion and the bottom surface;
  the optical element is disposed on the substrate, and the optical element covers the opening and abuts against the convex curved portion; and
  the fixed member is fixed on the substrate and adapted to press the optical element onto the substrate.

15. An optical mechanism, comprising:
 a substrate, having an opening and a recess, wherein the recess surrounds the opening and has a bottom surface;
 a supporting pad, disposed in the recess and abutting against the bottom surface;
 an optical element, disposed on the substrate, wherein the optical element covers the opening and abuts against the supporting pad; and
 a flat spring, fixed on the substrate and adapted to press the optical element onto the substrate, wherein the flat spring comprises a locking portion and a clamping portion, and the locking portion has one locking hole and two positioning holes.

16. The optical mechanism according to claim 15, wherein the opening is circular, the recess is annular.

17. The optical mechanism according to claim 15, wherein the supporting pad has a convex curved portion protruding away from the bottom surface of the recess, and a gap exists between the convex curved portion and the bottom surface.

18. The optical mechanism according to claim 17, wherein a size of the gap is greater than or equal to 0.1 mm.

19. The optical mechanism according to claim 18, further comprising:
 a mask, disposed on a side of the substrate away from the optical element, wherein an orthographic projection of the mask on the substrate covers a portion of the opening.

20. The optical mechanism according to claim 19, wherein a distance between the mask and the optical element is between 0.1 mm and 0.4 mm.

21. A projection device, comprising:
 an illuminating system, providing an illumination beam;
 an optical engine system, located on a transmission path of the illumination beam and adapted to convert the illumination beam into an image beam;
 a projection lens, located on a transmission path of the image beam and adapted to project the image beam to a projection target; and
 an optical mechanism, located between the optical engine system and the projection lens, and comprising a substrate, a supporting pad, an optical element and a flat spring, wherein:
  the substrate has an opening and a recess, the recess surrounds the opening and has a bottom surface;
  the supporting pad is disposed in the recess and abuts against the bottom surface;
  the optical element is disposed on the substrate, and the optical element covers the opening and abuts against the supporting pad; and
  the flat spring is fixed on the substrate and adapted to press the optical element onto the substrate, the flat spring comprises a locking portion and a clamping portion, and the locking portion has a locking hole and two positioning holes.

\* \* \* \* \*